United States Patent [19]

Pedrazza

[11] Patent Number: 4,558,320
[45] Date of Patent: Dec. 10, 1985

[54] APPARATUS FOR THE CONTACTLESS TRANSMISSION OF DATA OR THE LIKE BETWEEN TWO RELATIVELY ROTATING PARTS

[75] Inventor: Donatus Pedrazza, Zurich, Switzerland

[73] Assignee: Contraves AG, Zurich, Switzerland

[21] Appl. No.: 407,651

[22] Filed: Aug. 12, 1982

[30] Foreign Application Priority Data

Sep. 4, 1981 [CH] Switzerland .................. 5714/81

[51] Int. Cl.⁴ .................. G08C 19/06; G08C 19/10; G08C 19/12; G08C 19/16
[52] U.S. Cl. .................. 340/870.30; 340/870.31; 340/870.37; 324/60 C
[58] Field of Search .................. 324/207, 208, 61 R, 324/60 C; 340/870.31, 870.32, 870.37, 870.28, 870.30; 310/166, 40 R

[56] References Cited

U.S. PATENT DOCUMENTS

| | | | |
|---|---|---|---|
| 3,699,558 | 10/1972 | Hendley | 340/870.32 |
| 3,758,845 | 9/1973 | MacKelvie | 340/870.31 |
| 3,876,998 | 4/1975 | Richter et al. | |
| 4,011,551 | 3/1977 | Adler | |
| 4,223,300 | 9/1980 | Wiklund | 340/870.31 |
| 4,238,781 | 12/1980 | Vercellotti | 340/870.37 |
| 4,242,666 | 12/1980 | Reschovsky | 340/870.37 |
| 4,339,709 | 7/1982 | Brihier | 340/870.37 |
| 4,404,559 | 9/1983 | Renner | 340/870.31 |
| 4,404,560 | 9/1983 | Williams, Jr. | 340/870.37 |
| 4,418,348 | 11/1983 | Tanaka | 340/870.37 |
| 4,420,754 | 12/1983 | Andermo | 340/870.37 |

FOREIGN PATENT DOCUMENTS 598574 11/1977 Switzerland .
880227 10/1961 United Kingdom .

Primary Examiner—John W. Caldwell, Sr.
Assistant Examiner—Michael F. Heim
Attorney, Agent, or Firm—Werner W. Kleeman

[57] ABSTRACT

A first stationary part or component possesses a first conductor arrangement which is coupled in a contactless manner with a second conductor arrangement located upon a second part or component. The second conductor arrangement contains two essentially rotationally symmetrical parts which build-up a toroidal electrical and/or magnetic field. The first conductor arrangement is arranged in the field of the second conductor arrangement. To fabricate the conductor arrangements there can be used existing technology for manufacturing printed-circuit boards. The inventive apparatus can be advantageously used, for instance, in radar installations, vehicles having a rotatable upper portion, such as a turret, turbines, generators and theodolites. The dual conductor arrangement of the inventive apparatus provides a functionally better de-coupling and therefore reduced cross-talk.

18 Claims, 3 Drawing Figures

APPARATUS FOR THE CONTACTLESS TRANSMISSION OF DATA OR THE LIKE BETWEEN TWO RELATIVELY ROTATING PARTS

BACKGROUND OF THE INVENTION

The present invention relates to a new and improved construction of apparatus for the contactless transmission of electrical signals between a first part or component containing a first conductor arrangement and a second part or component rotatable relative thereto about a predetermined axis and containing a second conductor arrangement coupled in a contactless fashion with the first conductor arrangement.

In order to transmit electrical signals between relatively rotating parts it is well known to use slip rings containing electrical contact means. However, such are associated with the drawback that there can arise transmission errors due to interruption of the current or fluctuations in the resistances, caused by dust, carbon particles or grit, grease, oil and mechanical vibrations. These shortcomings can be overcome by resorting to the use of contactless transmission equipment.

Thus, for instance, in Swiss Patent No. 598,574, granted Nov. 15, 1977, there is disclosed an apparatus for the contactless transmission of alternating-current signals between two relatively rotating parts which possess two transformers each having two respective windings, and at each transformer the one winding is rotatably arranged relative to the other winding. With such apparatus there cannot be obtained high threshold frequencies governed by the high inductances of the transformer windings. Additionally, in order to avoid cross-talk there are required large distances between the transformers. This makes it impossible to construct a compact piece of equipment having small spatial requirements. A further shortcoming resides in the fact that the assembly, repair and exchange of the parts is both difficult and time-consuming.

SUMMARY OF THE INVENTION

Therefore, with the foregoing in mind it is a primary object of the present invention to provide a new and improved construction of apparatus for the contactless transmission of data or the like between two relatively rotating parts in a manner not associated with the aforementioned drawbacks and limitations of the prior art.

Another and more specific object of the present invention is directed to a new and improved construction of apparatus of the previously mentioned type, wherein it is possible to obtain threshold frequencies up to about 1000 MHz, a high transmission reliability, small spatial requirements with favourable fabrication costs and simple assembly and repair work.

A further object of the present invention is to provide a new and improved construction of an apparatus for the contactless transmission of data or the like between two relatively rotating parts in a manner providing functionally improved de-coupling and therefore reduced cross-talk.

Yet a further significant object of the present invention is directed to an improved apparatus for the contactless transmission of data or the like between two relatively rotating parts, which apparatus is relatively simple in construction and design, quite economical to manufacture, extremely reliable in operation, not readily subject to breakdown or malfunction, and requires a minimum of maintenance and servicing.

Now in order to implement these and still further objects of the invention, which will become more readily apparent as the description proceeds, the contactless transmission apparatus of the present development is manifested by the features that, the second conductor arrangement comprises two substantially parallel parts or components which are essentially rotationally symmetrical to the aforementioned axis of rotation, these two substantially parallel parts being spaced in axial direction from one another and generate a toroidal electrical and/or magnetic field. The first conductor arrangement is arranged in a sector of the field of the second conductor arrangement.

By providing both a first conductor arrangement and a second conductor arrangement, the beneficial effect is obtained that a functionally improved de-coupling of signals being transmitted is achieved. This results in a reduced degree of cross-talk or mutual interference of the signals being transmitted without requiring cumbersome shielding means. Reliable transmission can thereby be obtained in a compact construction.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
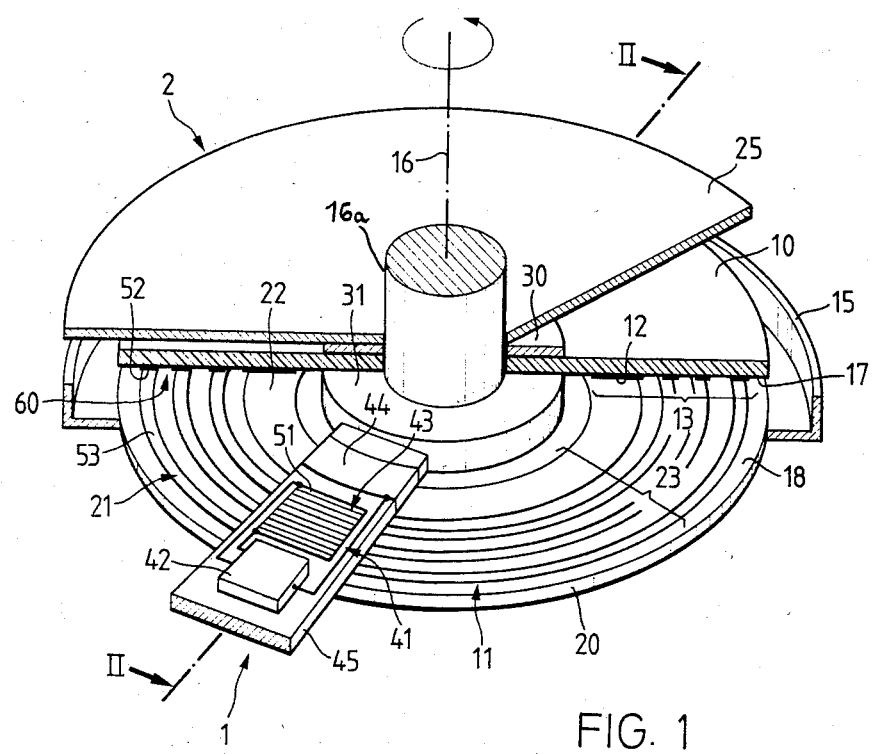
FIG. 1 is a perspective view of a contactless transmission apparatus showing details thereof, wherein in order to improve the illustration and clarity thereof a number of the parts have been shown in fragmentary and sectional view.

Describing now the drawings, in FIG. 1 there is shown an exemplary embodiment of inventive contactless transmission apparatus, viewed in axial direction, which will be seen to contain a first part or component 1 which is stationarily mounted, and a second part or component 2 mounted to be rotatable about an axis 16 defined by a related shaft or stub shaft 16a. The second essentially rotationally symmetrical part or component 2 is constituted by a lower support or carrier plate 20 having a lower conductor part 23 and an upper support or carrier plate 10 arranged substantially parallel to the lower support or carrier plate 20 and equipped with an upper conductor part 13. Both of the support plates 10 and 20 are electromagnetically screened towards the outside by a lower screening plate 15 and an upper screening plate 25, respectively. Both of the conductor parts 13 and 23 are disposed upon the mutually confronting inner surfaces or faces 17 and 18 of the support plates 10 and 20, respectively, and each consists of a respective capacitor plate 12 and 22 and a respective coil 14 and 21, the windings 52 and 53 of which are located in respective planes extending essentially perpendicular to the axis 16. The upper coil 14 and the lower coil 21 possess opposite winding directions or sense and are connected in parallel, as particularly evident by referring to FIG. 3. Consequently, there is achieved the beneficial result that the magnetic fields of both coils 14 and 21 add to produce a toroidal field. The same effect can be realized if, with the same winding direction, the coils are connected crosswise, i.e. cross connected. Closer to the axis 16, but in the same respective planes as the coils 14 and 21, there are arranged the capacitor plates 12 and 22 upon the support or carrier plates 10 and 20. The pairwise symmetrical arrangement of the coils and capacitor plates of the second conductor part or arrangement 11 affords the appreciable advantage that external electrostatic and electromagnetic disturbances are at least partially rendered innocuous by the compensation effect which is produced.

Figure 2:
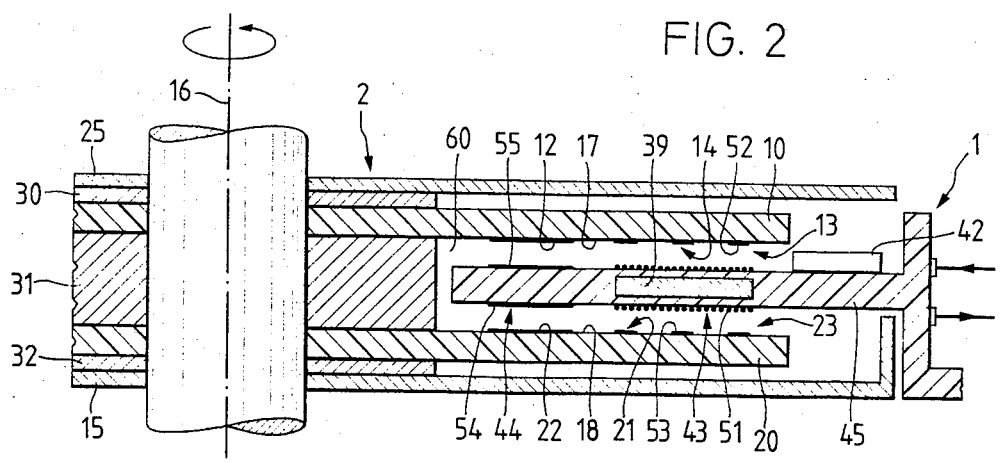
FIG. 2 is a fragmentary cross-sectional view through the arrangement depicted in FIG. 1, taken substantially along the line II—II thereof.

The first stationary part or component 1 contains a first conductor arrangement or assembly 41 arranged upon a pick-up plate 45. This first conductor arrangement or assembly 41 consists of a capacitor plate 44 as well as a coil 43 which is preferably constructed to contain a ferrite core 39, as best shown in FIG. 2, and also could be constructed as an air coil. The pick-up plate 45 and the first conductor arrangement or assembly 41 are arranged in a contactless fashion in a sector of the rotationally symmetrical space or region 60 between both of the conductor parts 13 and 23 of the second conductor arrangement or assembly 11. During the assembly of the apparatus the first part 1 and, in particular, the pick-up plate 45 can be simply inserted from the outside, and whenever the need for any repair work arises such can be exchanged without the necessity to employ special tools. The first conductor arrangement 41 has connected forwardly thereof an electrical amplifier 42 which, in the embodiment under discussion, is mounted in a space-saving manner upon the pick-up plate 45. The intermediate capacitor plate 44 is disposed in an essentially parallel arrangement between the lower capacitor plate 22 and the upper capacitor plate 12. The intermediate coil 43 is located between the upper coil 14 and the lower coil 21 and consists of windings 51 which extend essentially tangentially to the windings 52 and 53 of the upper coil 14 and the lower coil 21, respectively.

FIG. 2 is a cross-sectional view through the apparatus depicted in FIG. 1, taken substantially along the line II—II thereof. In this case the screening plates 15 and 25 have been likewise shown. Also readily visible is the sandwich-like or composite construction of the second part or component 2, whose support or carrier plates 10 and 20, screening plates 15 and 25 and the spacer plates 30, 31 and 32 of which are arranged essentially perpendicular to the axis 16. Between both of the support or carrier plates 10 and 20 there will be recognised the aforementioned space or chamber 60 which is essentially rotationally symmetrical, and within which there is arranged in contactless fashion the first conductor arrangement 41. The intermediate capacitor plate 44 consists of an upper part 55 and a lower part 54, both of which are electrically conductively connected with one another.

The capacitor plates 12, 22 and 44 and the coils 14, 21 and 43 can be fabricated economically and with high reliability as a printed series of conductors, the support plates 10 and 20 and the pick-up plate 45 as printed wiring boards in accordance with the well known technology for fabricating printed-circuit boards. Suitable as the material for the support and pick-up plates are, apart from the materials conventionally used in the printed-circuit board technology, glass, ceramics and other non-conductive materials.

Figure 3:
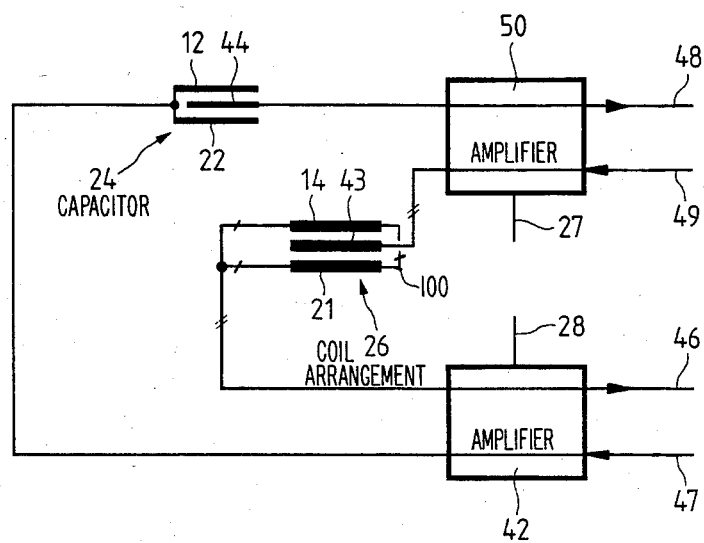
FIG. 3 illustrates a related schematic circuit diagram.

FIG. 3 illustrates a related circuit arrangement containing two amplifiers 42 and 50 each having a respective signal input 46 and 48 and a respective signal output 47 and 49. Further, there is shown the capacitor 24 with both of the outer capacitor plates 12, 22 and the inner capacitor plate 44, the coil arrangement 26 containing both of the outer coils 14, 21 and the inner coil 43. Both of the amplifiers 42 and 50 are powered by means of a respective electrical line 27 and 28. To the extent needed there can be used coaxial cables. The inventive apparatus is suitable for both data transmission and also video transmission, and there can be employed in conventional manner additional modules and structural elements such as multiplexers, oscillators and filters.

Providing both the capacitative transmission means substantially constituted by the capacitor plates 12, 55, 54 and 22 and the inductive transmission means substantially constituted by the induction coil 43 and the induction coils 14 and 21 results in a means of transmitting data signals comprising two functionally distinct pathways. This has the advantage that two functionally different types of data transmission channels may be established, with the ensuing advantage that data transmitted by one type of channel is de-coupled to a great extent from data transmitted by the other type of channel. This means that there is less cross-talk or mutual interference between data signals being transmitted by the two different types of channel. This provides more reliable data transmission between the stationary first part or component 1 and the rotatable second part or component 2 without requiring extensive shielding means. Both the cost and the bulk of such shielding means are saved and a more compact construction results.

The transmission output can be increased in that there are used a plurality of support or carrier plates and conductor arrangements, as the case may be, and between two support plates there can be capacitively transmitted in the one direction, and between two other support plates there can be inductively transmitted in the other direction. Equally, there can be arranged between two support or carrier plates a number of pick-up plates, the conductor arrangements of which can be selectively designed to be capacitive and/or inductive.

The inventive apparatus can be used in all those situations where data should be transmitted in the form of electrical signals between relatively rotating parts or components, especially in radar installations, tanks and armored vehicles having rotatable turrets, turbine and generator installations as well as theodolites, just to mention some of the more noteworthy possibilites.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An apparatus for the contactless transmission of electrical signals between first and second relatively rotatable parts, comprising:
    a stationary first part having a non-rotatable first conductor arrangement;
    a rotary second part rotatable relative to the first part about a predetermined axis;

said second part having a rotatable second conductor arrangement coupled in a contactless fashion with the non-rotatable first conductor arrangement;

said rotatable second conductor arrangement comprising two substantially planar parallel parts which are essentially continuously rotationally symmetrical with respect to said predetermined axis;

said two continuously rotationally symmetrical parts being spaced in axial direction from one another and generating a toroidal electrical and/or magnetic field; and said non-rotatable first conductor arrangement being located between said two substantially planar parallel parts in a sector of the field generated by the rotatable second conductor arrangement.

2. The apparatus as defined in claim 1, wherein:
said first and second conductor arrangements comprise electromagnetically coupled coils.

3. The apparatus as defined in claim 1, wherein:
said first and second conductor arrangements comprise capacitively coupled capacitor plates.

4. An apparatus for the contactless transmission of electrical signals between first and second relatively rotatable parts, comprising:
a stationary first part having a non-rotatable first conductor arrangement;
a rotary second part rotatable relative to the first part about a predetermined axis;
said second part having a rotatable second conductor arrangement coupled in a contactless fashion with the non-rotatable first conductor arrangement;
said rotatable second conductor arrangement comprising two substantially parallel parts which are essentially rotationally symmetrical with respect to said predetermined axis;
said two rotationally symmetrical parts being spaced in axial direction from one another and generating a toroidal electrical and/or magnetic field;
said non-rotatable first conductor arrangement being located in a sector of the field generated by the rotatable second conductor arrangement; and
said first and second conductor arrangements comprising inductively coupled coils and capacitively coupled capacitor plates.

5. The apparatus as defined in claim 4, wherein:
said coils and capacitor plates are structured as a printed series of conductors.

6. The apparatus as defined in claim 4, wherein:
the coils are arranged more remote and the capacitor plates closer to said predetermined axis in radial direction thereof.

7. The apparatus as defined in claim 2, wherein:
the coils of the second conductor arrangement possess opposed winding sense and are connected electrically in parallel with one another.

8. The apparatus as defined in claim 2, wherein:
the coils of the second conductor arrangement possess the same winding sense and are electrically connected crosswise with respect to one another.

9. The apparatus as defined in claim 1, wherein:
said apparatus contains a plurality of said stationary first and said rotary second parts.

10. An apparatus for the contactless transmission of electrical signals from a rotatable first component to a stationary second component, comprising:
a rotatable first component possessing two rotatable parts;
a stationary component possessing a stationary part;
each of said two rotatable parts being provided with electrical conductor components and being rotatable about a predetermined axis of rotation;
said two rotatable parts being arranged in mutually spaced relationship;
said stationary part being constructed as a pick-up plate stationarily arranged between said two rotatable parts;
said stationary pick-up plate having a first surface confronting said electrical conductor components of one rotatable part of said two rotatable parts and a second surface confronting said electrical conductor components of another rotatable part of said two rotatable parts; and
each of said first and second surfaces being provided with electrical conductor components arranged for generating a toroidal electrical field and a toroidal magnetic field.

11. The apparatus as defined in claim 10, wherein:
said electrical components of said two rotatable parts and of said stationary part comprise capacitors and induction coils; and
said capacitors and said induction coils being configured as printed circuit patterns and fabricated in multi-layer printed circuit board technology.

12. The apparatus as defined in claim 10, further including:
amplifiers for said electrical signals;
said electrical components of said two rotatable parts and of said stationary part comprising capacitor elements;
said capacitor elements conjointly defining a capacitor arrangement;
said electrical components of said two rotatable parts and of said stationary part comprising induction coil elements;
said induction coil elements conjointly defining an induction coil arrangement; and
said capacitor arrangement and said induction coil arrangement being operatively connected to said amplifiers.

13. The apparatus as defined in claim 10, wherein:
said electrical components of said two rotatable parts comprise induction coils; and
said induction coils being wound in mutually opposing directions of winding and being connected in parallel.

14. the apparatus as defined in claim 10, wherein:
said electrical components of said two rotatable parts comprise induction coils; and
said induction coils being wound in a common direction of winding and being cross-connected.

15. The apparatus as defined in claim 10, further including:
an upper shielding plate and a lower shielding plate;
said two rotatable parts and said stationary part being shielded against external electromagnetic influence conjointly by said upper shielding plate and said lower shielding plate;
said two rotatable parts and said stationary part being fabricated in sandwich construction; and
said two rotatable parts and said stationary part being arranged substantially perpendicular to said predetermined axis of rotation.

16. The apparatus as defined in claim 10, wherein:

said electrical components of said two rotatable parts and of said stationary part comprise capacitors and induction coils;

said capacitors and said induction coils being configured as printed circuit patterns and fabricated in multi-layer printed circuit board technology;

said capacitors and said induction coils being configured as annular circuit board patterns;

said annular circuit board patterns defining a radial direction extending substantially as right angles to said predetermined axis of rotation; and said induction coils being arranged more remote from said predetermined axis of rotation in said radial direction than said capacitors.

17. An apparatus for the contactless transmission of electrical signals from a rotatable first component to a stationary second component, comprising:

a rotatable first component possessing two rotatable parts;

a stationary component possessing a stationary part;

each of said two rotatable parts being provided with electrical conductor components and being rotatable about a predetermined axis of rotation;

said two rotatable parts being arranged in mutually spaced relationship;

said stationary part being constructed as a pick-up plate stationarily arranged between said two rotatable parts;

said stationary pick-up plate having a first surface confronting said electrical conductor components of one rotatable part of said two rotatable parts and a second surface confronting said electrical conductor components of another rotatable part of said two rotatable parts; and each of said first and second surfaces being provided with electrical conductor components arranged for generating a toroidal electrical field.

18. An apparatus for the contactless transmission of electrical signals from a rotatable first component to a stationary second component, comprising:

a rotatable first component possessing two rotatable parts;

a stationary component possessing a stationary part;

each of said two rotatable parts being provided with electrical conductor components and being rotatable about a predetermined axis of rotation;

said two rotatable parts being substantially planar and arranged in mutually spaced relationship;

said stationary part being constructed as a substantially planar pick-up plate stationarily arranged between said two rotatable parts;

said stationary pick-up plate having a first surface confronting said electrical conductor components of one rotatable part of said two rotatable parts and a second surface confronting said electrical conductor components of another rotatable part of said two rotatable parts; and each of said first and second surfaces being provided with electrical conductor components arranged for generating a toroidal magnetic field.

* * * * *